United States Patent Office 3,355,270
Patented Nov. 28, 1967

3,355,270
METAL CHELATE COMBUSTION IMPROVER FOR FUEL OIL
James W. Amick, Highland, and Russell A. Hunt, Jr., Griffith, Ind., assignors to Standard Oil Company, Chicago, Ill., a corporation of Indiana
No Drawing. Filed June 3, 1963, Ser. No. 284,831
7 Claims. (Cl. 44—68)

This invention relates to the improvement in combustion of fuel oil, and more particularly to the improvement in combustion of fuel oil through the utilization of a metal chelate of a high temperature product of a phenol, polyamine, and an aldehyde, as a combustion catalyst.

Combustion catalysts for fuel oil have been used in the past. Many of these catalysts have employed metals such as manganese, cobalt, and copper, as the catalytic agent. However, their properties in the fuel oil have not always been entirely satisfactory. For example, copper catalysts have tended to form insoluble materials in furnace oil upon exposure to storage conditions. This causes filter plugging in the heating equipment when the oil is burned. It is therefore an object of this invention to produce a combustion catalyst which is suitable for use in fuel oil and which retards the formation of insolubles in the fuel oil.

It has been discovered that a high temperature product prepared at from about 130° C. to 200° C. from (1) a phenol, (2) a polyamine, and (3) an aldehyde forms a chelate with common catalytic metals and that the resultant metal chelate is useful as a combustion catalyst in a fuel oil such as furnace oil. The metal chelate and especially the copper chelate exhibits highly desirable stability properties in the fuel oil particularly at a high concentration above 100 lbs./1,000 bbls. of the fuel, a concentration desirable for combustion control.

The metals having catalytic properties include the transition and similar metals such as titanium, vanadium, chromium, manganese, iron, cobalt, nickel, copper, and the like. Preferred are the members having an atomic number of about 22–29 and especially those which have been employed to a greater extent in the past as combustion catalysts such as manganese, cobalt, and particularly copper.

The chelating agent is a high temperature product of (1) a phenol, (2) a polyamine, and (3) an aldehyde and is produced at a temperature above about 266° F. (130° C.). This high temperature product is described in the copending application S.N. 277,026 filed Apr. 30, 1963, now abandoned, a continuation-in-part of S.N. 234,558. In general, the product is prepared from an alkyl para-substituted phenol having from 1–22 carbon atoms, a polyamine having ethylene groups between each pair of amino groups, and an aldehyde having from 1–2 carbon atoms. The polyamine generally has five or less amino groups since these are the most readily available and produce highly desirable reaction products. The polyamines having about two amino groups such as the diamines are particularly preferred. Suitable polyamines are ethylene diamine, diethylene triamine, triethylene tetramine, tetraethylene pentamine, and the like with ethylene diamine being particularly preferred. It is understood that the definition of the aldehyde includes homopolymers of the aldehyde, which easily yield the aldehyde, such as paraformaldehyde, trioxymethylene, and tetraoxymethylene. Naturally, the high temperature product is oil soluble. The product is initially prepared by mixing the phenol and polyamine together and then adding the aldehyde. The first step is generally carried out at temperatures in the order of 140° F. (60° C.) and below. The second step is generally carried out at temperatures in the order of 176° F. (80° C.) and below. Solvents, such as ethanol, may be employed. The product of these reactions is then heated to a temperature of at least 266° F. (130° C.), preferably 266° F.–392° F. (130° C.–200° C.), and especially 338° F.–356° F. (170° C.–180° C.) to produce the high temperature product. This last heating step may be optionally carried out in the presence of solvents such as xylene which have boiling points at or above 266° F. (130° F.).

As stated in application S.N. 277,026, the relative amounts of the reactants for the high temperature product depend on the number of amino groups in the defined polyamine. Since ethylene diamine is a very desirable and practical amine, the mole ratios of the reactants may be considered in respect to it. Generally the defined phenol and the diamine are present in mole ratios of from about 3:1 to about 1:1.5, preferably 2.1:1 to 1:1, and especially about 2:1. The latter mole ratios are desirable because of the low yet effective amounts of the polyamine necessary to produce a desired product. The aldehyde is present in respect to the defined phenol in a mole ratio of from about 1.2:1 to 3:1, but preferably about 1.2:1 to 2.5:1, with about 1.4:1 to 2.2:1 being especially desirable.

In the preparation of the metal chelate, an excess of the chelating agent (high temperature product) is commonly employed to insure the essentially complete chelation of the metal. This may range from 1.1 to 1.5 times the theoretical amount of chelating agent needed, the preferred being 1.2 to 1.4 times the theoretical amount. The theoretical amount is intended to represent that necessary to form a chelate with the metal. It is thought that the portion of the high temperature polymer which tends to form the metal chelate has the following structure

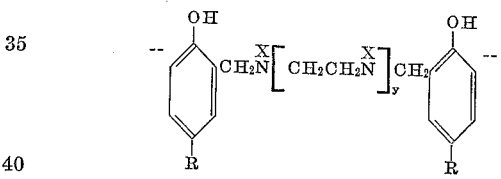

wherein R is the alkyl group in the defined phenol, X is hydrogen or a methylene-linked branched or cross-linked structure, and $y$ is 1 when ethylene diamine is utilized and greater than 1 when a triamine or higher is utilized. It is further thought that for a metal such as copper, approximately 1 atomic weight of metal will be chelated by the above structure. A more practical determination of the desired amount of the chelating agent can be carried out with known tests to indicate the presence or absence of unchelated metal in for example, a fuel oil or a concentrate for a fuel oil. One such test is the neocuproine test which is used to determine the presence of unchelated copper. Typically for 1 mole of copper (63.5 grams), the amounts of the high temperature product made from 1 mole of dodecylphenol, 1 mole of ethylene diamine, and 2 moles of formaldehyde necessary to produce the desired metal chelate are about 760 grams to 1,040 grams and preferably from about 830 grams to about 970 grams. Also typically for 1 mole of copper (63.5 grams), the amounts of the high temperature product made from 2 moles of dodecylphenol, 1 mole of ethylene diamine, and 3 moles of formaldehyde necessary to produce the desired metal chelate are about 680 grams to 930 grams and preferably from about 745 grams to about 870 grams.

In the preparation of the metal chelate, the salts of the metal are reacted with the chelating agent with or without a solvent present. One convenient method of preparation is carried out by reacting the metal acetate with the chelating agent in a xylene solution at a temperature above about 244° F. (118° C.), the boiling point of acetic acid. The metal chelates may also be prepared by employing the metal naphthenate, oleate, or stearate in place of the acetate.

The fuel oil is usually a distillate oil and more generally a hydrocarbon distillate oil. Illustrative of the fuel oil are diesel fuel, heavy industrial residual fuel (e.g. Bunker C), furnace oil, a heater oil fraction, kerosene, gas oil, light to heavy catalytic cycle oil, and the like. Naturally, mixtures of these oils are also envisaged. The fuel oil may be virgin or cracked petroleum distillate fuel oil and may advantageously boil in the range of from about 300° F. to about 900° F., and preferably in the range of about 320° F. to 650° F. A furnace oil is particularly desirable as a medium for the metal chelate, especially for the copper chelate.

The fuel composition of the invention comprises a major amount of a fuel oil and above about 100 lbs./1,000 bbls. of the defined transition metal chelate. The amount of the metal chelate is in the order of about 100 lbs.–1,000 lbs./1,000 bbls. of the fuel and preferably between about 100 lbs.–600 lbs./1,000 bbls. of the fuel. Naturally, the amounts which are particularly desirable will depend somewhat on the transition metal utilized and the economics of the system.

The following examples illustrate the preparation and utilization of some embodiments of this invention. It will be understood that these are for illustrative purposes only and do not purport to be wholly definitive with respect to conditions or scope.

*Example I*

A chelating agent was prepared by reacting 0.6 mole (157 grams) of 4-dodecylphenol, 0.6 mole (36 grams) of ethylene diamine, and 1.27 moles (38 grams) of formaldehyde as paraformaldehyde. The phenol and diamine were initially mixed together by stirring in a round bottomed glass flask. The paraformaldehyde was then added to the contents of the flask at approximately 65° C. The reaction was then carried out for approximately 45 minutes at 338° F.–356° F. (170° C.–180° C.). Sufficient xylene was added to the product to produce a 53 weight percent solution of the chelating agent.

Cupric acetate monohydrate (30 grams) was added with stirring to approximately 246 grams of the xylene solution containing the chelating agent. The xylene solution was held at approximately 257° F.–266° F. (125° C.–130° C.), during the cupric acetate addition. The solution was then stirred for 1 hour at 266° F. (130° C.). Approximately 50 ml. of xylene was added and the solution was cooled to 212° F. (100° C.). An additional 30 grams of the xylene solution with the chelating agent was added, and the resulting solution was stirred approximately 30 minutes. The resulting solution contained a copper chelate of the reaction product of the 4-dodecylphenol, ethylene diamine, and paraformaldehyde.

The copper chelate solution was dark green, was analyzed by X-ray fluorescence for copper, and was found to contain 2.51 weight percent copper. The copper chelate solution was passed through a filter paper with no isolubles being observed.

The copper chelate solution was added to a furnace oil and a light catalytic cycle oil to produce a 0.1 weight percent copper concentration. The fuels containing the copper chelate were immediately passed through a filter paper. No insolubles were noted. The filtered fuel oil was analyzed for copper by X-ray fluorescence, and was found to contain 0.108 weight percent copper.

The above results demonstrate that a reaction of 0.6 mole of 4-dodecylphenol, 0.6 mole of ethylene diamine, and 1.27 moles of formaldehyde as paraformaldehyde at 338° F.–356° F. (170° C.–180° C.) produced a high temperature product which formed a copper chelate when reacted with cupric acetate monohydrate at 257° F.–266° F. (125° C.–130° C.). These results also demonstrate that the copper chelate was soluble in xylene, and that the resulting xylene solution was soluble in a furnace oil and a light catalytic cycle oil.

*Example II*

The stability of the furnace oil and light catalytic cycle oil, each containing 0.1 weight percent copper, were tested by the proposed ASTM Accelerated Stability Test (ASTM Standards on Petroleum Products, vol. 1, page 1204, 1961 Edition), another Accelerated Stability Test carried out at 200° F. for 20 hours [Ind. Eng. Chem. 48, 1899 (1956)], and a three month storage test carried out at 110° F. (described in Example II of the aforementioned S.N. 277,026). The furnace oil and LCCO typically had respective API gravities of 36.1 and 29.1; and respective initial, 10%, 50%, 90%; and maximum distillation temperatures of 331° F. and 348° F., 395° F. and 452° F., 498° F. and 520° F., 595° F. and 593° F., 633° F. and 638° F. In the tests, the formation of sediment and the filtering properties of the oil were measured. The results are listed in Table I.

TABLE I.—STABILITY OF FUELS CONTAINING 0.1 WT. PERCENT COPPER

|  | Initial Inspections | | Proposed ASTM Test | 20 Hours at 200° F. | | 3 Months at 110° F. | |
| --- | --- | --- | --- | --- | --- | --- | --- |
|  | Sediment, mg./100 ml. | F.I.[1] | Insolubles, mg./100 ml. | Sediment, mg./100 ml. | F.I.[1] | Sediment, mg./100 ml. | F.I.[1] |
| Furnace Oil plus 0.1% Cu as Copper Chelate | 0.1 | 1.2 | 1.0 | 1.0 | 1.2 | 0.1 | 1.1 |
| LCCO plus 0.1% Cu as the Copper Chelate |  |  | 1.2 | 0.9 | 1.3 | 0.2 | 1.2 |

[1] Filterability Index.

The above results in Table I demonstrate the low values for sediment and desirable values of the Filterability Index and the acceptable stability of the furnace oil and light catalytic cycle oil. These results are significant because 0.1 wt. percent of copper as copper naphthenate in a light catalytic cycle oil has typically resulted in 84.4 mg. of sediment per 100 ml. and a Filterability Index of Plug I in the 3 month, 110° F. tests.

*Example III*

The effectiveness of copper chelate as a combustion catalyst for furnace oil was determined by carrying out combustion tests. The copper chelate was prepared from copper acetate and the high temperature product (53 weight percent xylene solution) described in Example I.

In carrying out the combustion tests, a burner (ABC Model 100 having a nozzle size equivalent to ¾ gal. per hour fired into a Bard furnace) was set to run at a certain smoke level (Shell-Bacharach Smoke Scale) on untreated furnace oil (without the copper chelate) and was maintained at that level for approximately 20 minutes. The untreated furnace oil was replaced with the same fuel with copper chelate and the test was run for an additional 20 minutes. Then the untreated furnace oil was again burned for approximately 20 minutes to determine if the burner produced the original smoke level. The results are listed in Table II below.

In Table II the concentrations of copper chelate in the oil are shown in terms of the weight percent of copper. The corresponding concentrations of the copper chelate are approximately 570 lbs./1,000 bbls. for 0.01 weight percent of copper, 57 lbs./1,000 bbls. for 0.001 weight percent of copper, and 43 lbs./1,000 bbls. for 0.00075 weight percent of copper. These values represent a slight excess of the chelating agent over the theoretical required.

TABLE II

| Wt. Percent of Copper (as Copper Chelate) in Furnace Oil | Initial Reading[1] without Copper Chelate | Reading[1] with Copper Chelate | Second Reading[1] without Copper Chelate |
|---|---|---|---|
| 0.01 | 3 | ½ | 3— |
| 0.001 | 3 | 2½ | 3 |
| 0.001 | 1 | ½ | 1— |
| 0.00075 | 3 | 2½ | 3 |
| 0.00075 | 1 | ½ | 1— |

[1] Shell-Bacharach Smoke Scale.

As noted from Table II, the use of 0.01 weight percent of copper as a copper chelate in furnace oil reduced the smoke content of the flue gas from a 3 smoke number to a ½ smoke number, a large reduction in the smoke content. The results also demonstrate that when the untreated furnace oil was again used in the test the smoke number rose again to approximately 3. The use of 0.001 weight percent of copper as copper chelate in furnace oil reduced the smoke number from 3 to 2½ and from 1 to ½, an effective reduction in smoke number.

Thus having described the invention, what is claimed is:

1. A fuel composition comprising a major amount of a fuel oil and above about 100 lbs./1000 bbls. of said fuel oil of a catalytic metal chelate as a combustion catalyst for said fuel oil, said metal chelate being prepared by the process comprising:
   (a) mixing at a temperature below about 140° F.
     (1) an alkyl para-substituted phenol having about 1–22 carbon atoms in said alkyl group, and
     (2) a polyamine having between 2 and 5 amino groups and an ethylene group linking each pair of amino groups,
   thus forming a first reaction product;
   (b) adding an aldehyde having from 1–2 carbon atoms, to said first reaction product at a temperature below about 176° F., thus forming a second reaction product;
   (c) heating said second reaction product at a temperature of at least about 266° F. to form a chelating agent; and
   (d) forming a metal chelate with said chelating agent, said metal being a transition metal having an atomic number from 22–29.

2. The fuel composition of claim 1 wherein said alkyl group of said phenol has about 8–12 carbon atoms, said polyamine is ethylene diamine, and said aldehyde has 1 carbon atom.

3. The fuel composition of claim 2 wherein said fuel oil is a distillate boiling in the range of about 230° F. to 650° F.

4. The fuel composition of claim 3 wherein said metal chelate is present in above about 100 lbs. to about 1,000 lbs./1,000 bbls. of said fuel.

5. The fuel composition of claim 1 wherein said metal is copper, said alkyl group of said phenol has 8–12 carbon atoms, said polyamine is ethylene diamine, said aldehyde has 1 carbon atom, and said high temperature reaction product is produced at a temperature of about 266° F.–392° F.

6. The fuel composition of claim 5 wherein said fuel oil is a distillate boiling in the range of about 320° F. to 650° F. and said chelate is present in above about 100 lbs. to about 1,000 lbs./1,000 bbls. of said fuel oil.

7. The fuel composition of claim 6 wherein said phenol and ethylene diamine are present in mole ratios of from about 3:1 to about 1:1.5 and said aldehyde is present in respect to said phenol in a mole ratio of from about 1.2:1 to about 3:1.

References Cited
UNITED STATES PATENTS

| 2,023,142 | 12/1935 | Max | 44—68 |
| 2,086,775 | 7/1937 | Lyons et al. | 44—68 |
| 2,255,597 | 9/1941 | Downing et al. | 44—73 X |
| 2,891,853 | 6/1959 | Niedzielski | 44—68 |
| 2,962,442 | 11/1960 | Andress | 44—73 X |

DANIEL E. WYMAN, *Primary Examiner.*

W. J. SHINE, *Assistant Examiner.*

UNITED STATES PATENT OFFICE

CERTIFICATE OF CORRECTION

Patent No. 3,355,270            November 28, 1967

James W. Amick et al.

It is hereby certified that error appears in the above numbered patent requiring correction and that the said Letters Patent should read as corrected below.

Column 2, line 8, for "(130° F.)" read -- (130° C.) --; column 6, line 14, for "230" read -- 320 --.

Signed and sealed this 3rd day of December 1968.

(SEAL)
Attest:

Edward M. Fletcher, Jr.
Attesting Officer

EDWARD J. BRENNER
Commissioner of Patents